United States Patent [19]

Kärnä et al.

[11] Patent Number: 5,531,932
[45] Date of Patent: Jul. 2, 1996

[54] METAL COMPOUND/PROTONIC ACID CONTAINING ELECTRICALLY CONDUCTIVE COMPOSITIONS AND METHODS FOR THEIR PREPARATION

[75] Inventors: Toivo Kärnä, Porvoo; Jukka Laakso, Helsinki; Timo Niemi, Jyväskylä; Heikki Ruohonen, Helsinki; Esko Savolainen, Hollola; Helge Lindström, Hamari; Esa Virtanen, Porvoo; Olli Ikkala, Helsinki, all of Finland

[73] Assignee: Neste Oy, Kulloo, Finland

[21] Appl. No.: 234,870

[22] Filed: Apr. 28, 1994

Related U.S. Application Data

[62] Division of Ser. No. 927,858, Aug. 11, 1992, Pat. No. 5,340,499.

[51] Int. Cl.$^6$ .................... H01B 1/00; H01B 1/12
[52] U.S. Cl. .......... 252/518; 252/500; 252/519; 252/520; 252/521; 528/422; 528/210
[58] Field of Search .................... 252/500, 518, 252/519, 520, 521; 528/210, 422

[56] References Cited

U.S. PATENT DOCUMENTS

| | | | |
|---|---|---|---|
| 4,935,164 | 6/1990 | Wessling et al. | 252/500 |
| 4,983,322 | 1/1991 | Eisenbrumer | 252/500 |
| 5,006,278 | 4/1991 | Elsenbaumer | 427/385.5 |
| 5,171,478 | 12/1992 | Han | 252/500 |
| 5,281,363 | 1/1994 | Schacklette et al. | 252/500 |
| 5,304,335 | 4/1994 | Sagnes et al. | 252/500 |

FOREIGN PATENT DOCUMENTS

| | | |
|---|---|---|
| 152632 | 12/1989 | European Pat. Off. . |
| 168621 | 9/1990 | European Pat. Off. . |
| 168620 | 9/1991 | European Pat. Off. . |
| 497379 | 8/1992 | European Pat. Off. . |
| WO90/01775 | 2/1990 | WIPO . |
| WO90/10297 | 9/1990 | WIPO . |
| WO/13601 | 11/1990 | WIPO . |

OTHER PUBLICATIONS

Kobayashi et al, J. Electroanal. Chem., vol. 177, pp. 281–291 (1984).
Chiang et al, Synthetic Metals, vol. 13, pp. 193–205 (1986).
Salaneck et al, Synthetic Metals, vol. 13, pp. 291–297 (1986).
Plastics Technology, 37:9, pp. 19–20 (1991)/Aug.
Cao et al, Synthetic Metals, vol. 48, pp. 91–97 (1992).

*Primary Examiner*—Paul Lieberman
*Assistant Examiner*—Mark Kopec
*Attorney, Agent, or Firm*—Armstrong, Westerman, Hattori, McLeland & Naughton

[57] ABSTRACT

Compositions and methods are described that relate to the use of reaction products of metal compounds and protonic acids for plasticizing and neutralizing acidic, protonated compositions comprising substituted and unsubstituted polyanilines and co-polymers and or mixtures thereof; and for reducing the percolation threshold for conductivity in blends with insulating bulk polymers.

13 Claims, No Drawings

METAL COMPOUND/PROTONIC ACID CONTAINING ELECTRICALLY CONDUCTIVE COMPOSITIONS AND METHODS FOR THEIR PREPARATION

This is a division of application Ser. No. 07/927,858 filed Aug. 11, 1992, now U.S. Pat. No. 5,340,499.

FIELD OF THE INVENTION

This invention relates generally to conducting polymer compositions, and more particularly relates to electrically conductive compositions and shaped articles, such as parts, containers, fibers, tapes, films and coatings and the like, from polyanilines and blends thereof; and to methods of forming and use of the same compositions and conductive articles. More specifically, this invention relates to the use of reaction products of metal compounds and protonic acids as plasticizers; and for reducing the percolation threshold for the onset of conductivity in blends comprising polyanilines and insulating bulk polymers; and for neutralizing acidic, protonated polyaniline compositions.

BACKGROUND OF THE INVENTION

Electrically conductive, thermoplastic polymer compounds are of increased practical interest, for instance, for packaging electronic instruments and parts, and to solve a wide range of static discharge, electrostatic dissipation and electromagnetic shielding problems. Often, such compounds are made by mixing, for example, carbon black, stainless steel fibers, silver or aluminum flakes or Nickel-coated fibers with insulating bulk thermoplastics such as polystyrene, polyolefins, nylons, polycarbonate, acrylonitrile butadiene styrene co-polymers (ABS), and the like. These filled compounds are subsequently processed into desired shapes and articles by common plastics processing methods such as extrusion, injection or blow molding and the like. Major problems related to the above filled thermoplastic compounds are that processing of these materials is not trivial and is often associated with excessive machine wear, and that the final compounds frequently exhibit undesirable mechanical properties such as brittleness and a reduced elongation to break in comparison with the corresponding properties of the unfilled matrix polymer.

More recently, there has been an increased interest in replacing such carbon black or metal-filled compounds with intrinsically electrically conductive polymers and their blends with common insulating polymers. The latter systems are believed to be more cost competitive, easier to process and to exhibit desirable mechanical properties. Among the various conductive polymers, the polyanilines in particular have attracted attention because of their excellent environmental stability and their low production costs.

Polyaniline is well known in the art, and the preparation of the electrically conductive form of this polymer based on, for example, contacting polyanilines with protonic acids has been described. Green, A. G., and Woodhead, A. E., "Aniline-black and Allied Compounds, Part 1," J. Chem. Soc., Vol. 101, pp. 1117 (1912); Kobayashi, et al., Electrochemical Reactions . . . of Polyaniline Film-Coated Electrodes, J. Electroanl. Chem., Vol. 177, pp. 281–91 (1984); U.S. Pat. Nos. 3,963,498, 4,025,463 and 4,983,322. Typical examples of such described protonic acids are HCL, $H_2SO_4$, sulfonic acids of the type $R_1$—$SO_3H$, phosphoric acids, etc. Chiang, J. -C. and MacDiarmid, A. G., "Polyaniline: Protonic Acid Doping of the Emeraldine Form to the Metallic Regime", Synthetic Metals, Vol. 13, p. 196 (1986); Salaneck, W. R. et al., "A Two-Dimensional-Surface "State" Diagram for Polyaniline", Synthetic Metals, Vol. 13, p. 297 (1986). Such acids form complexes with polyaniline, which, generally, exhibit electrical conductivities of $10^{-3}$ S/cm or more. Their electrical properties make these so-called "doped" polyanilines and their blends and compounds with common insulating bulk polymers suitable for a variety of the antistatic and shielding applications that are currently served by metal or carbon black filled systems.

Processing of polyanilines has been described in several patents and patent applications. In U.S. Pat. No. 5,006,278 a conductive product is described which has been made by mixing a solvent, a doping agent and a polyaniline, whereafter the solvent has been removed by evaporation. In PCT Publication No. WO 9013601 a polymer mixture is prepared by mixing a suitable solvent with a mixture of polyaniline and a multi-sulphonic acid, used as a doping agent, whereafter the solvent is evaporated. According to this specification, the doping is generally carried out at 20°–25° C. it is described that the doping can be carried out as a heterogeneous reaction, followed by dissolution of the mixture in a suitable solvent. The processing into a final shape is carried out in the presence of a solvent. (p. 15, 1.23).

PCT Publication No. WO 9010297, U.S. Pat. No. 5,002,700 and European Patent Publication No. EP 152 632 describe the use of dodecylbenzene sulphonic acid as a doping agent for polyaniline, PCT Publication No. WO 9001775 describes a multi-sulphonic acid as a doping agent for polyaniline with the advantage of better thermal stability compared with other sulphonic acids. In the examples of this specification, the doping of polyaniline has been carried out in a suspension of polyaniline and the sulphonic acid in an aqueous solution of formic acid. In none of the examples of the above mentioned patent specifications, however, have adequate methods been described for melt processing of polyaniline compositions.

Melt processing of compounds comprising conductive polyanilines, has typically been executed by mechanically mixing the components, where the conductive polyaniline is in the solid form and the matrix polymer in its molten form before shaping the blend into the desired article. Generally, the blends obtained exhibit varying conductivity, are of non-homogeneous quality and of poor mechanical properties and, generally show a high percolation threshold for the onset of electrical conductivity.

It has indeed been suggested, that certain polyaniline-based systems and blends may be processed using standard polymer processing techniques. For example, in Plastics Technology 37 (1991):9 pp. 19–20 is described the use of protonated, conductive polyanilines to impart conductivity to mixtures with common insulating thermoplastic polymers such as nylons and poly(vinylchloride). In this application, however, the conductive polyaniline is in the form of solid, intractable particles, which, much like carbon black, are dispersed in the non-conducting matrix, which is in its molten form. Melt-processing of these compounds requires special melt dispersion techniques; European Patent Publication Nos. EP 168 620 and 168 621. A relatively high content of conductive polyaniline is required to reach desirable levels of conductivity in the blends with insulating polymers; or, in other words, the percolation threshold for the onset of conductivity is relatively high. Thus, in the aforementioned blends of solid polyaniline particles dispersed in poly(vinylchloride) a percolation threshold existed of about at least 13% w/w of the conductive polyaniline. Such a high content of conductive polyaniline particles is not desirable, because it is not economical and, in addition, may substantially alter the mechanical properties of the blend in comparison with those of the pure matrix polymer.

An improved method of making conductive polyaniline compositions has been described in Finnish Patent Application 915 760. According to this application, polyaniline, or derivatives thereof, and an excess of an organic protonic acid are mechanically mixed. The liquid-like mixture or suspension is subsequently thermally solidified between 40°–250° C. in a mixer. As a result, a dry, solid composition, in the form of a granulate comprising protonic acid-doped polyaniline is obtained. The solid polyaniline-protonic acid complex can subsequently be mixed with insulting thermoplastic polymers and formed into parts of desired shapes using standard polymer melt-processing techniques. Improved visual surface characteristics and lower percolation thresholds for the conductivity were observed for parts made according to this method. However, as stated above, an excess of acid is used in the technique. The latter generally is unacceptable from a processing, application and environmental point of view. The excess acid, of course, can be removed, but this process is tedious and uneconomical, and limits the scope of the products that can be manufactured.

In a publication in Synthetic Metals (Vol. 48 (1992) pp. 91–97) are described blends that exhibit much lower percolation thresholds, sometimes even below 1% w/w, of conductive polyaniline and a wide variety of non-conducting matrix polymers, such as polyethylenes, poly(vinylchloride), polystyrene, nylons, and the like; poly(methylmethacrylate), polycarbonate, acrylonitrile butadiene styrene copolymers (ABS), and the like. However, invariably, the compositions that exhibit such low percolation thresholds are made from solutions of the conductive polyaniline and the matrix polymers, which is uneconomical, and limits the use to fabrication of products such as film, coatings and fibers.

Thus, clearly, a need exists for electrically conductive polyaniline compositions that can be processed from the melt, and for polyaniline blends with, for example, insulating bulk polymers that exhibit a low percolation threshold, and do not contain an excess of protonic acid, i.e. are neutral or only slightly acidic, and for economical methods to fabricate articles from the melt of such compositions.

SUMMARY OF THE INVENTION

It is accordingly an object of the present invention to provide electrically conductive compositions containing polyaniline and the reaction products of metal compounds and protonic acids, that can be processed from the melt and that are approximately neutral or only slightly acidic.

It is additionally an object of the present invention to provide electrically conductive blends and articles that comprise polyaniline and further comprise the reaction products of metal compounds and protonic acids, that can be processed from the melt and that display a low percolation threshold for the onset of electrical conductivity.

Another object of the present invention is to provide a method to make, from the melt, electrically conductive compounds and articles comprising polyaniline that are neutral or only slightly acidic by the addition of the reaction products of metal compounds and protonic acids.

It is still another object of the present invention to provide a method to make, from the melt, electrically conductive compounds and articles comprising polyaniline that display a low percolation threshold by the addition of the reaction products of metal compounds and protonic acids to blends of said polyaniline and insulating matrix polymers.

Still another object of the present invention is to provide a method to make, from the melt, electrically conductive compounds and articles comprising polyaniline that display a low percolation threshold by the addition of metal compounds, that form a fluid composition with protonic acids, to blends of acidic polyaniline compositions and insulating matrix polymers.

It is still yet another object of the present invention to provide shaped articles, fibers, coatings, films, tapes and the like from electrically conductive polyaniline and blends of electrically conductive polyaniline with insulating bulk polymers and pre-polymers.

Additional objects, advantages and novel features of the invention will be set forth, in part, in the description which follows, and, in part, will become apparent to those skilled in the art on examination of the following, or may be learned by practice of the invention. The objects and advantages of the invention may be realized and attained by means of the instrumentalities and combinations particularly pointed out in the appended claims.

In one aspect of the invention, neutral, or only slightly acid, melt-processable polyaniline compositions are fabricated; for example, an amount of the metal oxide ZnO is contacted at 150° C. with 2 moles of dodecylbenzene sulfonic acid to yield a fluid reaction product. This fluid reaction product is mixed at 180° C. with the conductive salt complex of polyaniline and dodecylbenzene sulfonic acid, and an essentially neutral, plasticized melt is formed, which is processed into useful shapes such as, for example, films, fibers and pads, and the like.

In another aspect of this invention, the above described melt of the conductive polyaniline-dodecylbenzene sulfonic acid complex and the reaction product of the ZnO and the dodecylbenzene sulfonic acid is blended at elevated temperatures with molten insulating matrix polymers, such as, for example polyethylene. Surprisingly, the inventors have found that compositions are obtained that can be processed from the melt and that display unexpectedly low percolation thresholds for electrical conductivity.

DETAILED DESCRIPTION OF THE INVENTION

Definitions

It must be noted that, as used in the specifications and the appended claims, the singular forms "a", "an" and "the" include plural referents unless the context clearly dictates otherwise. Thus, for example, reference to "a polyaniline" includes mixtures of polyanilines, reference to "a reaction product" includes mixtures of two or more reaction products, reference to "a metal compound" includes mixtures of two or more metal compounds, reference to "an acid" includes mixtures of two or more acids, and the like.

When the term "polyaniline" is used in this application, it is used generically to include substituted and unsubstituted polyanilines and polyaniline copolymers, and mixtures thereof, unless the context is clear that only the specific nonsubstituted form is intended.

As used hereinafter, the "percolation threshold" is defined as the weight fraction of conductive compound needed to impart a conductivity of $10^{-8}$ S/cm or more to a blend with an insulating matrix substrate.

The term "insulating" or "substantially non-conducting material" refers to materials that have an electrical conductivity of less than about $10^{-10}$ S/cm.

The specification "approximately neutral or slightly acidic" compositions refer to compositions that impart to water after 24 hrs exposure a pH of between about 4 and 8.

The compositions of this invention typically include three or four types of components.

(i) A substituted or unsubstituted polyaniline or co-polymers, or mixtures thereof;

(ii) A protonic acid solute that form salt complexes with the substituted or unsubstituted polyanilines or co-polymers or mixtures thereof and that have a conductivity greater than about $10^{-6}$ S/cm;

(iii) A metal compound that neutralizes protonic acids and forms a reaction product with certain acids, having a softening temperature of below about 300° C. The addition of this component effectuates the special eventuality described in this invention of neutralization, plasticization and/or percolation-threshold reduction in the aforementioned polyaniline compositions.

(iv) One or more optional organic substrate phases. This phase is an insulating material, and can be one or more polymers or pre-polymers, or mixtures thereof, which is fluid during compounding or mixing with (i), (ii) and (iii) and/or during shaping into the conductive article.

Surprisingly, it has been discovered that, unlike the electrically conductive compositions described in the prior art, materials can be prepared from the melt comprising polyaniline, substituted polyanilines or co-polymers, or mixtures thereof, that are approximately neutral or only slightly acidic; and that display a percolation threshold for the onset of conductivity in blends with insulating substrates as low as below 1% w/w.

The Polyaniline

One component in the present materials is substituted or unsubstituted polyaniline or a polyaniline copolymer as described in U.S. Pat. No. 4,983,322, which by reference is incorporated herein in its entirety.

Particularly preferred for the use in the practice of this invention, is the polyaniline that is derived from unsubstituted aniline.

In general, the polyanilines useful in the practice of this invention are those which are of sufficiently high molecular weight to exhibit high electrical conductivity, i.e. having a weight average molecular weight of more than 5,000 daltons. In general substituted and unsubstituted polyanilines and polyaniline copolymers will be of at least 20 repeat units. In the preferred embodiments of the invention, the number of repeat units is at least about 25, and in the most preferred embodiments, the number of repeat units is at least about 50.

The polyaniline can be conveniently used in the practice of this invention in any of its physical forms. Illustrative of useful forms are those described in U.S. Pat. No. 4,983,322, which by reference is incorporated herein in its entirety. For unsubstituted polyaniline, useful forms include leucoemeraldine, protoemeraldine, emeraldine, nigraniline and toluprotoemeraldine forms. Useful polyanilines can be prepared through the use of chemical and electrochemical synthetic procedures referred to, for example, in the above references.

The Protonic Acid

A second component of the compositions of the present invention is a protonic acid that imparts a conductivity to the composition.

As used herein, a "protonic acid" is an acid that protonates the polyaniline to form a salt complex with said polyaniline, which has a conductivity greater than about $10^{-6}$ S/cm. Preferred protonic acids are those that protonate the polyaniline to form a salt complex, said complex having an electrical conductivity of greater than about $10^{-3}$ S/cm, and particularly preferred protonic acids are those that impart a conductivity of greater than about 0.1 S/cm to the salt complex with polyaniline. Amongst these particularly preferred embodiments, most preferred are those embodiments in which said polyaniline salt complex has a conductivity of greater than 10 S/cm.

Protonic acids are well known as dopants in the conductive polymer art as shown by the references to J. -C. Chiang and A. G. MacDiarmid; W. R. Salaneck et al.; U.S. Pat. No. 5,006,278; PCT Publication No. WO 9013601; Synthetic Metals Vol. 48 (1992) pp. 91–97, noted above.

Metal Compound

The third component of the compositions of the present invention is a metal compound that generally neutralizes protonic acids and forms a reaction product with certain acids having a softening temperature of below about 300° C.

Surprisingly, it was discovered that mixtures of certain metal compounds, such as, and in particular, the amphoteric metal oxide ZnO, and certain protonic acids, such as, for example, dodecylbenzene sulfonic acid, form a fluid especially after heating at elevated temperatures, e.g. above about 100° C.; and that when the resulting fluid was mixed with an approximately neutral conductive salt complex of polyaniline and a protonic acid, an essentially neutral, plasticized melt was formed that could be directly formed into useful conductive articles, such as fibers, films, parts and the like; and that when this melt was blended with molten insulating substrates, compositions were obtained that displayed unexpectedly low percolation thresholds for electrical conductivity.

Thus, in this instant the reaction product of the metal compound and the protonic acid fulfils a special role of plasticizer and, in blends, a percolation-threshold reducing agent. It will become apparent from the examples attached hereto that the latter effect is unusual, and cannot simply be effected by the addition of most commonly available plasticizers.

The metal compounds for use in the practice of this invention generally are compounds that form condensation products with protonic acids and can be oxides, hydroxides, halides, stearates, carbonates, palmitates, octoates, laurares, phenolares, maleares, octylthioglycolates, and the like. Particularly preferred metal compounds for use in the present invention consist of the group of metal compounds comprising the elements Zn, Cu, Mg, Ba, Al, Ca, Ti, Fe, Zr, Cd, Pb and Sn. Amongst the particularly preferred metal compounds for use in the present invention, the especially preferred compounds are the metal compounds comprising the elements Zn, Cu, Ca or Mg. Amongst the particularly preferred metal compounds for use in the present invention, the most preferred compounds are the metal compounds comprising the element Zn. In the preferred embodiment of the present invention, the metal compounds are selected from the group consisting of oxides and hydroxides. In the particularly preferred embodiment of the present invention the metal compounds are oxides. Amongst the particularly preferred metal oxides for use in the present invention is ZnO.

In the embodiments of the present invention, the certain protonic acid that reacts with the aforementioned metal compound and is neutralized by the above metal compound to form a reaction product having a softening temperature of below about 300° C., is selected from the group consisting of those of Formulas I and II:

or

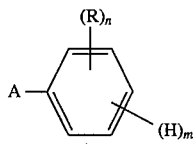

wherein:

"A" is sulphonic acid, selenic acid, phosphonic acid, boric acid or a carboxylic acid group; or hydrogen sulphate, hydrogen selenate or hydrogen phosphate;

"n" is an integer in the range of 0–5 inclusive;

"m" is an integer in the range of 0–4 inclusive, with the proviso that the sum of n+m is 5;

"$R_1$" is an alkyl, alkenyl, alkoxy, alkanoyl, alkylthio, alkylthioalkyl containing 1–20 carbon atoms; or alkylaryl, arylalkyl, alkylsulphinyl, alkoxyalkyl, alkylsulphonyl, alkoxycarbonyl, carboxylic acid, where the alkyl or alkoxy has from 0 to about 20 carbon atoms; or alkyl having from 3–20 carbon atoms substituted with one or more sulphonic acid, carboxylic acid, halogen, nitro, cyano, diazo or epoxy moieties; or a substituted or unsubstituted 3, 4, 5, 6, or 7 membered aromatic or alicyclic carbon ring, which ring may include one or more divalent heteroatoms of nitrogen, sulfur, sulfinyl, sulfonyl or oxygen such as thiophenyl, pyrolyl, furanyl, pyridinyl.

In addition to these monomeric acid forms, $R_1$ can be a polymeric backbone from which depend a plurality of acid functions "A". Examples of polymeric acids include sulfonated polystyrene, sulfonated polyethylene and the like.

R is the same or different at each occurence and is an alkyl, alkenyl, alkoxy, cycloalkyl, cycloalkenyl, alkanoyl, alkylthio, aryloxy, alkylthioalkyl, alkylaryl, arylalkyl, alkylsulphinyl, alkoxyalkyl, alkylsulphonyl, aryl, arylthio, arylsulphinyl, alkoxycarbonyl, arylsulphonyl, carboxylic acid, halogen, cyano, or alkyl which has been substituted with one or more sulfonic acid, carboxylic acid, halogen, nitro, cyano, diazo or epoxy moieties; or any two R substitutent taken together are an alkylene or alkenylene group completing a 3, 4, 5, 6 or 7 membered aromatic or alicyclic carbon ring or multiples thereof which ring or rings may include one or more divalent heteroatoms of nitrogen, sulfur, sulfinyl, sulfonyl or oxygen. R typically has from about 1 to about 20 carbons, especially 3 to 20 and more especially from about 8 to 20 carbons.

Particularly preferred for use in the practice of this invention are the protonic acids of formulae I and ! 1 wherein:

A is sulphonic acid;

n is the integer 1 or 2;

m is the integer 3 or 4, with the proviso that the sum n+m is 5;

$R_1$ is alkyl or alkoxy, having from 2 to about 14 carbon atoms, or an alkyl having from 3 to about 12 carbon atoms substituted with one or more halogen moieties;

R is alkyl or alkoxy, having from 4 to about 14, especially 12 carbon atoms, or alkyl substituted with one or more halogen moieties.

In the most preferred embodiments, the protonic acid that according to the present invention is reacted with the metal compound is dodecylbenzene sulphonic acid.

Those skilled in the art of chemistry will be readily able to select the particular combination of metal compounds and protonic acids that yield a reaction product with a softening temperature of below about 300° C.

It should be noted that the protonic acid that is used to form the conductive complex with the polyaniline can be different from, or the same as the certain protonic acid that is used to form the reaction product with the metal compound.

In the event that an excess of a protonic acid of the component (ii) is used to form the electrically conductive complex with the polyaniline (i), the reaction product (iii) of the metal compound and the protonic acid may simply be formed by adding the metal compound to the acidic, protonated polyaniline composition. In this instant, the protonic acid of components (ii) and (iii) of the present invention are identical, and the metal compound additionally fulfils a role as neutralizer.

The Substrate Phase

A fourth, optional, component of the compositions of this invention is the substrate. This can be bulk oligomeric or polymeric or pre-polymeric materials which can be transformed into a fluid (liquid or semisolid) form during processing so as to achieve the required intimate mixing with the polyaniline, the protonic acids and the metal compound-acid reaction product. Illustrative of useful polymeric substrates are polyethylenes, isotactic polypropylene, elastomers, styrene-butadiene-styrene (SBS) copolymers, polybutadiene, and the like, poly(vinylchloride), polystyrene, poly(vinylalcohol), poly(ethylene terephthalate), nylons, such as nylon 6, nylon 6.6, nylon 12 and the like; poly(methylmethacrylate), polycarbonate, acrylonitrile butadiene styrene copolymers (ABS), and the like. Generally, the substrate is a substantially nonconductive material.

Overall Compositions

The proportions of materials of the present invention can vary widely, depending on the desired level of electrical conductivity and the application. However, the relative amounts of the polyaniline, protonic acid and metal compound is such that approximate neutrality or only slight acidity is achieved in the final composition; i.e. that when the materials of the present inventions are exposed to water, the pH is between 3 and 8; more preferably between 4 and 8; and most preferably between 5 and 8.

Typically, the compositions of this invention include polyaniline, substituted polyaniline, copolymers and/or mixtures thereof, a protonic acid, the reaction product of a protonic acid and a metal compound, and an optional insulating substrate. The relative weight or volume proportions of these materials strongly depend not only on the desired conductivity, but also on the density, molecular weight and the number of acid protons or functionality of the various components involved. Therefore, below are given general practical guidelines in the form of molar fractions and ratios for one of the preferred polyaniline/acid/metal compound systems, namely that comprised of unsubstituted polyaniline, dodecylbenzene sulfonic acid and ZnO.

In one embodiment of the present invention directed for use with the preferred polyaniline/dodecylbenzene sulfonic acid/ZnO system, an approximately neutral, or slightly acidic polyaniline-dodecylbenzene sulfonic acid salt complex is formed, wherein the molar ratio between acid protons and the aniline repeat unit is from about 0.2 to about 0.5, more preferably from about 0.3 to about 0.5. When mixed with this neutral, or slightly acidic salt complex, the added reaction products of the metal compound and the protonic acid also are neutral or slightly acidic. The molar ratio of said metal compound reaction products, based on the element Zn, relative to said polyaniline-dodecylbenzene sulfonic acid complex, based on the aniline repeat unit, according to this embodiment of the present invention ranges from about 0.2 to about 20, preferably from about 0.25 to 15, and most preferably from about 0.3 to about 10.

In another embodiment of the present invention compositions can be prepared using highly acidic polyaniline-salt complexes, i.e. those complexes containing an amount of acid or acids in excess of 0.5 moles of acid protons per aniline repeat unit. In this embodiment, the composition of the metal compound protonic acid reaction mixture needs to be altered and adjusted so that approximate neutrality or slight acidity of the final mixture is achieved after mixing with the acidic polyaniline-salt complex. Thus, in this embodiment of the present invention, the amount of protonic acid that is reacted with the metal compound is reduced by an amount of acid protons that is approximately the same as the excess amount used in the preparation of the acidic polyaniline-salt complex. In a particular embodiment of the present invention, the excess amount of acid or acids used in the preparation of the polyaniline-salt complex is such that only the pure metal compound without any additional acid is added to the mixture, and is reacted with the excess acid to yield the plasticizing compound and, in blends with insulating substrates, the percolation threshold reducing agent. Conversely, if in another embodiment of the present invention the polyaniline-salt complex is prepared with a deficiency in acidic protons, i.e. less than 0.3 mole per aniline repeat unit, the metal compound-acid reaction mixture will contain an excess of acid, so that after mixing of the final blend approximate neutrality or only slight acidity is achieved.

In the above preferred embodiments the protonic acid is dodecylbenzene sulfonic acid and the metal compound is ZnO, which have normal equivalents of protons of 1 and 2, respectively. In other embodiments of the present invention acids and metal compounds may be used that have different normal equivalents of protons. It will be appreciated to those skilled in the art of acid-base chemistry that the relative proportions of the different acids and metal compounds need to be varied according to the normal equivalent of protons of the components to ensure neutrality or only slight acidity of the final mixture.

The amount of conductive polyaniline-salt complex in blend compositions comprising insulating substrates may vary widely, and is dependent on the desired level of conductivity. Hence, the content of the polyaniline-salt complex according to this invention ranges from at least about 0.05% by weight to about 90% by weight, preferably from about 0.1% by weight to about 40% by weight, and most preferably from about 0.5% by weight to about 20% by weight.

In addition to the polyaniline homopolymer or substituted aniline homopolymers, copolymers, or mixtures thereof, a protonic acid, a metal compound and a substrate, the compositions used in the present invention can include other optional components which either dissolve or do not dissolve in said compositions. The nature of such optional components can vary widely, and include those materials such as flame retardants, anti-oxidants, heat stabilizers, inorganic fillers, dyes and the like; which are known to those of skill in the art for inclusion in polymer articles. The total of other materials that can be present is as much as 98% of the total mixture, and being optional can be omitted altogether. Usually, for commercially attractive products these added components may make up 2% to 50% by weight of the total final product.

The method of forming the electrically conductive compositions of this invention is not very critical and can vary widely. It is important, however, that at some stage the substrate be processed with the polyaniline, protonic acid and metal compound in a fluid (liquid, semi-solid, or molten form) to assure proper intimate mixing. Otherwise, no special requirements are needed and common melt-processing techniques known to those ordinarily skilled in the art of polymer processing can be applied, such as extrusion, kneading and the like.

Also, the sequence in which the different components are mixed together is not critical and may be varied widely. For example, the polyanilines may be first mixed with an excess of protonic acid to ensure homogeneous doping. Subsequently, the metal compound may be added to neutralize the complex, and simultaneously form the reaction product with the excess amount of protonic acid, which fulfils the special role of plasticizer and the percolation-threshold reducing agent. The resulting mixture can be directly processed from the melt in desirable shapes or be blended with the optional insulating substrate phase to yield the final blend of the present invention. Alternatively, the metal compound-protonic acid product is first prepared by common mixing methods, to yield the plasticizing and percolation-threshold reducing agent. This product, subsequently may be added to a separately prepared conductive polyaniline-protonic acid complex; and the resulting mixture can be directly processed from the melt in desirable shapes or be blended with the optional insulating substrate phase. Other mixing methods and sequences may be practiced within the scope of the present invention, if so desired.

Typically, mixing and preparation of the metal compound-acid reaction product and blending with the polyaniline-salt complex is carried out a elevated temperatures, but below temperatures where thermal degradation commences. Preferably, processing temperatures range from at least about 40° C. to below about 300° C., and most preferably from at least about 50° C. to below about 250° C.

Common manufacturing methods may be used to fabricate useful electrically conductive articles from the compositions of the present invention. It will be appreciated by those skilled in the art of polymer product manufacturing that a variety of technologies may be utilized, depending on the nature and shape of the desired article or product, such as melt-spinning, melt-blowing, injection molding, film casting, and the like.

The following specific examples are presented to illustrate the invention and are not to be construed as limitations thereon.

EXAMPLE 1

0.2 g zinc oxide (ZnO, Aldrich) powder and 0.6 g liquid dodecylbenzene sulphonic acid (DBSA, Tokyo Kasei), (ZnO:DBSA=1:3 w/w), were mixed in a dispersing mixer, whereafter the mixture was thermally solidified at 150° C. using a screw-mixer. A white reaction product was obtained that exhibited a melting temperature of about 115° C. The reaction product was further transferred into a powder or a granulate using a grinder or a granulator, respectively.

A solid, acidic complex comprising polyaniline (PANI) and DBSA, PANI-DBSA, with a weight ratio (w/w) of PANI:DBSA=1:4, was prepared in a screw mixer at 180° C. as described in FI Patent Application 915 760 and herein included as a reference.

0.8 g of the ZnO-DBSA reaction product, 0.8 g of the PANI-DBSA complex and 10.4 g polystyrene (PS, Neste Chemicals, Finland, SB 735) resin were mixed in an injection molding apparatus at 180° C. The obtained shaped article had a surface resistance of 500 kh and a surface pH of 7. The total amount of the electrically active component, polyaniline, was only 1.5 wt.-% of the total composition.

EXAMPLE 2

A 1:1 (w/w) mixture comprising acidic, solid PANI-DBSA complex and the reaction product of ZnO and DBSA, both prepared according to Example 1, was made by mechanical mixing. The resulting mixture was further melt-processed at 130° C. using a screw-mixer. The obtained composition had a surface resistance of 100 k$\Omega$, exhibited excellent plasticizing properties and was neutral.

EXAMPLE 3

1105 g acidic PANI-DBSA complex (1:2.5 w/w) and 1606 g of a dispersion of ZnO in DBSA (1:2.7, w/w) were mechanically mixed. During mixing evolution of heat was observed and the mixture solidified completely in about 30–50 minutes. The as-formed solid, neutral composition had a dark green color, a surface resistance of 500 k$\Omega$ and exhibited good melting characteristics.

EXAMPLE 4

400 g ZnO and 2880 g DBSA (1:7.2 w/w) were mixed in a blender. To this mixture, 720 g of the emeraldine base (EB) form of PANI was added and mixed. The resulting dark grey liquid mixture was solidified according to a process described in FI Patent Application 915 760 at 185° C. The resulting solid was neutral, had a surface resistance of 500K $\Omega$ and exhibited good melting characteristics.

EXAMPLE 5

A 1:2.5 (w/w) complex of PANI-DBSA was prepared according to a process described in FI Patent Application 915 760. A reaction product was prepared by reacting 27 wt-% ZnO with 73 wt-% DBSA at 130° C. A blend was prepared by mixing 2.4 g of a mixture containing 2.4 pads ZnO-DBSA reaction product and 3.5 pads of the PANI-DBSA complex and 9.6 g polystyrene (Neste, SB 735). The mixture was injection molded at 170° C. The resulting injection molded article had a surface resistance of 30M$\Omega$ and excellent surface appearance.

EXAMPLE 6

15 g of a 1:1.2 (w/w) PANI-DBSA complex was mechanically mixed with 15 g of the reaction product of ZnO and DBSA of Example 1. The resulting mixture was mixed at 130° C. using an apparatus as described in FI Patent Application 915 760. The resulting composition was neutral, had good plasticizing characteristics and had a surface resistance of 30k$\Omega$.

EXAMPLE 7

5 g PANFEB and 15 g of the reaction product of ZnO and DBSA of Example 1 was mixed according to Example 6. The resulting composition was neutral and had a surface resistance of 5M$\Omega$.

EXAMPLE 8

25 wt-% of ZnO-DBSA (1:3, w/w) and 75 wt-% PANI-DBSA (1:4, w/w) were mixed at 150° C. The surface resistance of the resulting composition was 3k$\Omega$.

EXAMPLE 9

20 wt-% of ZnO-DBSA (1:3, w/w) and 80 wt-5 PANI-DBSA (1:2.5, w/w) were mixed at 150° C. The surface resistance of the resulting composition was 200 $\Omega$.

EXAMPLE 10

20 wt-% of the composition of Example 9 and 80 wt-% polystyrene. (Neste, SB 735) were mixed at 160° C. The surface resistance of the resulting blend was 500k$\Omega$.

EXAMPLE 11

25 wt-% of the composition of Example 9 and 75 wt-% of polyethylene (Neste, NCPE 2220) were mixed at 160° C. The surface resistance of the resulting blend was 2M$\Omega$.

EXAMPLE 12

50 wt-% of ZnO-DBSA (1:4, w/w) and 50 wt-% PANI-DBSA (1:4, w/w) were mixed at 150° C. The surface resistance of the resulting composition was 2M$\Omega$.

EXAMPLE 13

13 wt-% of the composition of Example 12 and 87 wt-% of polyethylene (Neste, NCPE 2220) were mixed at 150° C. The surface resistance of the resulting blend was 2M$\Omega$.

EXAMPLE 14

20 wt-% of the composition of Example 12 and 80 wt-% of polyethylene (Neste, NCPE 2220) were mixed at 150° C. The surface resistance of the resulting blend was 1M$\Omega$.

EXAMPLE 15

50 wt-% ZnO-DBSA (1:4, w/w) and 50 wt-% PANI-DBSA (mole ratio 1:0.5) were mixed at 150° C. The surface resistance of the composition was 500$\Omega$.

EXAMPLE 16

25 wt-% ZnO-DBSA (1:3, w/w) and 75 wt-% PANI-DBSA (1:2.5, w/w) were mixed at 150° C. The surface resistance of the composition was 1k$\Omega$.

EXAMPLE 17

20 wt-% of the composition of Example 16 and 80 wt-% polystyrene (Neste, SB 735) were mixed at 150° C. The surface resistance of the resulting blend was 5M$\Omega$.

EXAMPLE 18

20 wt-% of the composition of Example 16 and 80 wt-% polyethylene (Neste, NCPE 2220) were mixed at 150° C. The surface resistance of the resulting blend was 10MΩ.

Examples 1–18 are summarized in Table 1.

From the blends according to Examples 7–18 testing pieces were prepared in an injection moulding machine. The blends prepared in these experiments had by the injection moulding good plasticizing properties, the working trace was good, and the mechanical properties of the products closely resembled those of the matrix plastics.

TABLE 1

| Example | ZnO/DBSA (w/w) | PANI/DBSA (w/w) | T/°C. | Matrix polymer | pH | R |
|---|---|---|---|---|---|---|
| 1 | 1:3 0.8 g | 1:4 0.8 g | 180 | PS 10.4 g | 7 | 500 kΩ |
| 2 | 1:3 0.8 g | 1:4 0.8 g | 130 | No Matrix | 6–7 | 100 kΩ |
| 3 | 1:2.7 1606 g | 1:2.5 1105 g | RT | No Matrix | 6–7 | 500 kΩ |
| 4 | 1:7.2 2880 g | 720 g | 185 | No Matrix | 6–7 | 500 kΩ |
| 5 | 1:2.7 0.98 g | 1:2.5 1.425 g | 170 | PS 9.6 g | 6–7 | 30 MΩ |
| 6 | 1:3 15 g | 1:1.2 15 g | 130 | No Matrix | 6–7 | 30 MΩ |
| 7 | 1:3 15 g | 5 g | 130 | No Matrix | 6–7 | 5 MΩ |
| 8 | 1:3 2.5 g | 1:4 7.5 g | 150 | No Matrix | 6–7 | 3 kΩ |
| 9 | 1:3 2.0 g | 1:2.5 8.0 g | 150 | No Matrix | 6–7 | 200 kΩ |
| 10 | 1:3 2.0 g | 1:2.5 8.0 g | 160 | PS 40 g | 6–7 | 500 kΩ |
| 11 | 1:3 2.0 g | 1:2.5 8.0 g | 160 | PE 30 g | 6–7 | 200 kΩ |
| 12 | 1:4 2.0 g | 1:4 2.0 g | 150 | No Matrix | 5–6 | 200 kΩ |
| 13 | 1:4 2.0 g | 1:4 2.0 g | 150 | PS 27 g | 5–6 | 2 MΩ |
| 14 | 1:4 2.0 g | 1:4 2.0 g | 150 | PE 16 g | 5–6 | 1 MΩ |
| 15 | 1:4 2.0 g | 1:0.5 2.0 g | 150 | No Matrix | 5–6 | 500 Ω |
| 16 | 1:3 2.0 g | 1:2.5 6.0 g | 150 | No Matrix | 6–7 | 1 kΩ |
| 17 | 1:3 2.0 g | 1:2.5 6.0 g | 150 | PS 54 g | 6–7 | 5 MΩ |
| 18 | 1:3 | 1:2.5 | 150 | PE | 6–7 | 10 MΩ |

COMPARATIVE EXAMPLES A–C (OUTSIDE THIS INVENTION)

Comparative Example A

An amount of 0.6 g of polyaniline (PANI) (of an inherent viscosity in 97% sulfuric acid, at room temperature, in a 0.1% w/w solution of 1.2 dl/g), in its conductive salt form with dodecylbenzene sulphonic acid (DBSA), having a molar ratio of PANI(DBSA)$_{0.5}$, was mixed with 2.4 g of finely divided powder of isotactic polypropylene (Neste, VB 80 12 B, MFR=8 g/10 min @ 230° C.) using a laboratory-scale twin-screw extruder at 170° C., at 100 rpm for 5 minutes. The resulting polypropylene blend contained 20 wt-% of the PANI(DBSA)$_{0.5}$ complex and had an electrical conductivity of $10^{-8}$ S/cm, as measured by the usual four probe technique. Small samples of the blend were immersed in water and the pH was monitored. After 24 hrs the pH of the water was 5.6.

This example illustrates that conductive PANI(DBSA)$_{0.5}$ salt could be melt-blended with thermoplastics to produce an electrically conducting polymer blend which was only slightly acidic after immersion in water for 24 hours. However, the required amount of the PANI salt was high to achieve desirable levels of conductivity, i.e. the percolation threshold was higher than 20 wt-%.

Comparative Example B

A total of 3 g of a mixture containing 2.4 g of low density polyethylene (LDPE, Neste, NCE 1804, MI 1.8) and 0.6 grams of PANI(DBSA)$_{1.1}$, i.e. a PANI(DBSA)-complex containing an excess amount of DBSA (wt-ratio PANI/DBSA=¼), was mixed in a laboratory-scale twin-screw extruder at 180° C. at 100 rpm for 3.5 minutes. The resulting blend of LDPE contained 20 wt-% of PANI(DBSA)$_{1.1}$ and had a conductivity of $2\times10^{-4}$ S/cm. Pieces of the blend were immersed in water and the pH was monitored. After 24 hrs the pH of the water was pH ~1.

Comparative Example C

A polymer blend was made according to Example B with the exception that only 10 wt-% of PANI(DBSA)$_{1.1}$ was used instead of 20%. The conductivity of the resulting blend was $3\times10^{-7}$ S/cm. Pieces of the blend were immersed in water and the pH was monitored. After 24 hrs the pH of the water was pH ~1.

Comparative Examples B and C demonstrate that electrically conducting polymer blends could be produced using thermoplastics and PANI(DBSA)$_{1.1}$ utilizing conventional melt processing techniques. The examples further demonstrate, however, that addition of an excess amount of DBSA to the PANI-salt order to lower the percolation threshold of the conductivity. However, due to the large amount of free acid in the blend, the acidity of the final product was unacceptably high.

EXAMPLE 19

ZnO powder and liquid DBSA, using different molar ratios ranging from 1:1–1:8, were mixed between 130°–180° C. During the reaction, water was liberated under the formation of a complex between ZnO and DBSA, suggesting the formation of the structure denoted Zn(DBS)$_2$. This solid complex had a melting temperature of ca. 115° C., was observed to be liquid crystalline and of fiber forming characteristics, in addition of being non-conducting. For simplicity, in subsequent examples, this reaction product will be referred to as Zn(DBS)$_2$.

EXAMPLE 20

An amount of 2.7 g of LDPE, 0.3 g of PANI(DBSA)0.5 and 0.86 g of the Zn(DBS)$_2$ material prepared according to the method of Example 19 such that the molar ratio Zn(DBS)$_2$/PANI(DBSA)$_{0.5}$=1.0, were mixed in a twin-screw extruder for 3.5 minutes at 180° C. at 100 rpm. The conductivity of the resulting polymer blend, containing 7.8 wt-% of PANI(DBSA), had a four probe conductivity of $8\times10^{-2}$ S/cm. Pieces of the blend were immersed in water and the pH was monitored. After 24 hrs the pH of the water was pH ~4.

EXAMPLES 21–25

Blends were made according to Example 20 but with different amounts of PANI(DBSA)$_{0.5}$. The ratio of Zn(DBS)$_2$/PANI(DBSA)$_{0.5}$ was maintained at 1.0. The conductivities of the resulting polymer blends were measured and are listed in Table 2 below.

TABLE 2

| Example | wt-% PANI(DBSA)$_{0.5}$ | Conductivity (S/cm) |
| --- | --- | --- |
| 21 | 2.3 | $4 \times 10^{-5}$ |
| 22 | 3.2 | $2 \times 10^{-3}$ |
| 23 | 4.4 | $3 \times 10^{-2}$ |
| 24 | 7.8 | $8 \times 10^{-2}$ |
| 25 | 12.8 | $2 \times 10^{-1}$ |

EXAMPLE 26

An amount of 2.7 g of isotactic polypropylene (i-PP, Neste, VB 80 12 B), 0.3 g of PANI(DBSA)$_{0.5}$ and 0.86 g of Zn(DBS)$_2$, prepared according to Example 19, were mixed in a twin-screw extruder at 170° C., at 100 rpm for 5 minutes. The resulting polymer blend, containing 7.8 wt-% PANI(DBSA)$_{0.5}$ of the total composition of the blend, had a four probe conductivity of $2 \times 10^{-2}$ S/cm. Pieces of the blend were immersed in water and the pH was monitored. After 24 hrs the pH of the water was pH ~4.

EXAMPLES 27–31

Blends were made according to Example 26 but with different the amounts of PANI(DBSA)$_{0.5}$. The ratio of Zn(DBS)$_2$/PANI(DBSA)$_{0.5}$ was varied. The conductivities of the resulting polymer blends were measured and are listed in Table 3 below.

TABLE 3

| Example | wt-% PANI(DBSA)$_{0.5}$ | Conductivity (S/cm) |
| --- | --- | --- |
| 27 | 3.2 | $4 \times 10^{-6}$ |
| 28 | 4.4 | $2 \times 10^{-3}$ |
| 29 | 7.8 | $2 \times 10^{-2}$ |
| 30 | 12.8 | $6 \times 10^{-2}$ |
| 31 | 21.0 | $2 \times 10^{-1}$ |

EXAMPLE 32

An amount of 2.7 g polystyrene (Neste, SB 735), 0.3 g PANI(DBSA)$_{0.5}$ and 0.86 g of Zn(DBS)$_2$, prepared according to example 1, were mixed in a twin-screw extruder at 190° C. at 100 rpm for 5 minutes. The resulting polymer blend, containing 7.8 wt-% of PANI(DBSA)$_{0.5}$ of the total composition of the blend, had a four probe conductivity of $2 \times 10^{-2}$ S/cm. Pieces of the blend were immersed in water and the pH was monitored. After 24 hrs the pH of the water was pH ~5.

EXAMPLE 33–37

Blends were prepared according to Example 14 but with different the amounts of PANI(DBSA)$_{0.5}$. The ratio of Zn(DBS)$_2$/PANI(DBSA)$_{0.5}$ was maintained at 1.0. The conductivities of the resulting polymer blends were measured and are listed in Table 4 below.

TABLE 4

| Example | wt-% PANI(DBSA) | Conductivity (S/cm) |
| --- | --- | --- |
| 33 | 2.3 | $8 \times 10^{-7}$ |
| 34 | 3.2 | $5 \times 10^{-6}$ |
| 35 | 4.4 | $8 \times 10^{-4}$ |
| 36 | 7.8 | $2 \times 10^{-3}$ |
| 37 | 12.8 | $2 \times 10^{-2}$ |

Examples 20–37 and Tables 2–4 demonstrate that by the addition of Zn(DBS)$_2$ to a mixture of a common thermoplastic commodity polymer and PANI(DBSA)$_{0.5}$, polymer blends could be produced, using ordinary melt processing techniques, that exhibited surprisingly lower percolation thresholds for electrical conductivity (1–3 wt-% of the conducting polyaniline complex) than observed in blends produced without the addition of the Zn(DBS)$_2$.

EXAMPLE 38

A polymer blend was made according to example 2 with the exception that instead of ZnO, CuO (Aldrich) was used as the metal compound. The resulting blend was electrically conducting, the four point conductivity being $10^{-5}$ S/cm.

Example 20 demonstrate that also other metal compounds than ZnO could be used to form a condensation product with a protonic acid that acted as a percolation-threshold reducing agent.

EXAMPLE 39

A polymer blend was made according to example 2 with the exception that instead of DBSA, ethylsulfonic acid (ESA, Aldrich) was used as the protonic acid. The resulting blend was electrically conducting and the four point conductivity was measured to be $10^{-4}$ S/cm.

EXAMPLE 40

7.17 g of Zn(DBS)$_2$ was mixed with 1.7 g of conducting polyaniline compound (Versicon™, Allied-Signal) for 5 minutes at 130° C. in a conical twin-screw extruder. 0.355 g of the obtained mixture, 0.717 g of additional Zn(DBS)$_2$ and 2.328 of acrylonitrile-butadiene-styrene (ABS) were mixed in the same extruder at 160° C. for 5 minutes. The conductivity of films of the above blend, pressed at 180° C., was $8.3 \times 10^{-2}$ S/cm, containing only 2 wt-% of the conducting component Versicon™.

Comparative Example D (outside this invention)

Example 1 was repeated, but instead of DBSA, p-toluene sulphonic acid (TSA, Aldrich) was used. Mixing of ZnO and TSA resulted in the formation of a white powder that did not display an melting point below 300° C. A polymer blend was made according to Example 2 with the exception that instead of Zn(DBS)$_2$, the above condensation product of ZnO and TSA was used. The resulting blend was nonconducting and optical microscopy showed that the blend comprised of dispersed particles of the condensation product.

Comparative Example E (outside this invention)

A polymer blend was made according to Example 20 with the exception that instead of Zn(DBS)$_2$, the common, commercial plasticizers, pentadecyl phenol and dodecylphenol (Aldrich) were used. The blends, although well plasticized, were nonconducting.

This example illustrates that the use of the aforementioned condensation products of metal compounds, preferably ZnO, and protonic acids indeed were unusually effective in functioning as a neutralization, plasticization and percolation-threshold reducing agents, which was not observed in the use of the common plasticizers as those employed in Example 39.

We claim:

1. Method for making an electrically conductive polymer composition, the electrically conductive polymer composition comprising an admixture of:

(a) a complex having an electrical conductivity of at least about $10^{-6}$ S/cm, of:
      (i) a conjugated polymer, having substituted or unsubstituted aniline repeating units and being selected from the group consisting of polyaniline, substituted polyanilines, or copolymers thereof; and
      (ii) a first protonic acid, the first protonic acid being selected to impart said electrical conductivity to said conjugated polymer;

(b) a reaction product having a softening temperature of below about 300° C., of (1) a metal compound MX wherein M is selected from the group consisting of Zn, Cu, Mg, Ba, Al, Ca, Ti, Fe, Zr, Cd, Pb and Sn, and X is selected from the group consisting of oxides, hydroxides, halides, stearates, carbonates, palmitates, octoates, laurates, phenolares, maleares, and octylthioglycolates, and (2) a second protonic acid, which may be the same or different from the first protonic acid of said complex, having a structural formula I-II:

$A - R_1$  I or

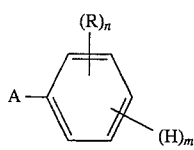  II wherein:

"A" is sulfonic acid, selenic acid, phosphonic acid, boric acid or a carboxylic acid group; or hydrogen sulphate, hydrogen selenate or hydrogen phosphate;

"n" is an integer in the range of 0–5 inclusive; "m" is an integer in the range of 0–4 inclusive, with the proviso that the sum of n+m is 5;

"$R_1$" is an alkyl, alkenyl, alkoxy, alkanoyl, alkylthio, alkylthioalkyl containing 1–20 carbon atoms; or alkylaryl, arylalkyl, alkylsulphinyl, alkoxyalkyl, alkylsulphonyl, alkoxycarbonyl, carboxylic acid, where the alkyl or alkoxy has from 0 to about 20 carbon atoms; or alkyl having from 3–20 carbon atoms substituted with one or more sulfonic acid, carboxylic acid, halogen, nitro, cyano, diazo or epoxy moieties; or a substituted or unsubstituted 3, 4, 5, 6, or 7 membered alicyclic carbon ring, which ring may include one or more divalent heteroatoms of nitrogen, sulfur, sulfinyl, sulfonyl or oxygen such as thiophenyl, pyrolyl, furanyl, pyridinyl; or a polymeric backbone to which A units are attached;

R is the same or different at each occurrence and is an alkyl, alkenyl, alkoxy, cycloalkyl, cycloalkenyl, alkanoyl, alkylthio, aryloxy, alkylthioalkyl, alkylaryl, arylalkyl, alkylsulphinyl, alkoxyalkyl, alkylsulphonyl, aryl, arylthio, arylsulphinyl, alkoxycarbonyl, arylsulphonyl, carboxylic acid, halogen, cyano, or alkyl which has been substituted with one or more sulfonic acid, carboxylic acid, halogen, nitro, cyano, diazo or epoxy moieties; or any two R substituents taken together are an alkylene or alkenylene group completing a 3, 4, 5, 6 or 7 membered aromatic or alicyclic carbon ring or multiples thereof, which ring or rings may include one or more divalent heteroatoms of nitrogen, sulfur, sulfinyl, sulfonyl or oxygen, with R typically having from 1 to about 20 carbons;

said method comprising contacting said metal compound MX with a mixture comprising said electrically conductive complex of said conjugated polymer and said first protonic acid and said second protonic acid wherein the molar ratio between the acidic protons of said first protonic acid and the aniline repeat units of said conjugated polymer is at least about 0.5; and wherein said metal compound MX reacts with the excess of said first and second protonic acids to yield a reaction product of said metal compound and said first and second protonic acids; wherein said reaction product neutralizes and plasticizes said electrically conductive polymer composition.

2. Method according to claim 1, wherein said contacting is carried out at temperatures in the range from at least about 40° C. to less than 300° C.

3. Method according to claim 2, wherein said contacting carried out at temperatures in the range from at least about 50° C. to less than about 250° C.

4. Method for making the composition of claim 1, wherein a substantially nonconductive substrate is added to the polymer composition.

5. Method for making the electrically conductive polymer composition of claim 1, wherein the metal compound MX is ZnO.

6. Method for making the electrically conductive polymer composition of claim 1, wherein said reaction product is formed between ZnO and dodecylbenzene sulphonic acid.

7. Method for making the electrically conductive polymer composition of claim 1, wherein the composition has a pH of 3 to 8.

8. Method for making an electrically conductive polymer composition, the electrically conductive polymer composition comprising an admixture of:

(a) a complex having an electrical conductivity of at least about $10^{-6}$ s/cm, of:
      (i) a conjugated polymer, having substituted or unsubstituted aniline repeating units and being selected from the group consisting of polyaniline, substituted polyanilines, or copolymers thereof; and
      (ii) a first protonic acid, the first protonic acid being selected to impart said electrical conductivity to said conjugated polymer;

(b) a reaction product having a softening temperature of below about 300°°C., of (1) a metal compound MX wherein M is selected from the group consisting of Zn, Cu, Mg, Ba, Al, Ca, Ti, Fe, Zr, Cd, Pb and Sn, and X is selected from the group consisting of oxides, hydroxides, halides, stearates, carbonates, palmitates, octoates, laurates, phenolates, maleates, and octylthioglycolates, and (3) a second protonic acid, which may be the same or different from the protonic acid of said complex, having a structural formula I-II:

$A - R_1$  I or

-continued

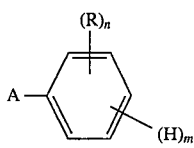

wherein:
"A" is sulfonic acid, selenic acid, phosphonic acid, boric acid or a carboxylic acid group; or hydrogen sulphate, hydrogen selenate or hydrogen phosphate;
"n" is an integer in the range of 0–5 inclusive;
"m" is an integer in the range of 0–4 inclusive, with the proviso that the sum of n+m is 5;
"$R_1$" is an alkyl, alkenyl, alkoxy, alkanoyl, alkylthio, alkylthioalkyl containing 1–20 carbon atoms; or alkylaryl, arylalkyl, alkylsulphinyl, alkoxyalkyl, alkylsulphonyl alkoxycarbonyl, carboxylic acid, where the alkyl or alkoxy has from 0 to about 20 carbon atoms; or alkyl having from 3–20 carbon atoms substituted with one or more sulfonic acid, carboxylic acid, halogen, nitro, cyano, diazo or epoxy moieties; or a substituted or unsubstituted 3, 4, 5, 6 or 7 membered alicyclic carbon ring, which ring may include one or more divalent heteroatoms of nitrogen, sulfur, sulfinyl, sulfonyl or oxygen such as thiophenyl, pyrolyl, furanyl, pyridinyl; or a polymeric backbone to which A units are attached;
R is the same or different at each occurrence and is an alkyl, alkenyl, alkoxy, cycloalkyl, cycloalkenyl, alkanoyl, alkylthio, aryloxy, alkylthioalkyl, alkylaryl, arylalkyl, alkylsulphinyl, alkoxyalkyl, alkylsulphonyl, aryl, arylthio, arylsulphinyl, alkoxycarbonyl, arylsulphonyl, carboxylic acid, halogen, cyano, or alkyl which has been substituted with one or more sulfonic acid, carboxylic acid, halogen, nitro, cyano, diazo or epoxy moieties; or any two R substituents taken together are an alkylene or alkenylene group completing a 3, 4, 5, 6 or 7 membered aromatic of alicyclic carbon ring or multiples thereof, which ring or rings may include one or more divalent heteroatoms of nitrogen, sulfur, sulfinyl, sulfonyl or oxygen, with R typically having from 1 to about 20 carbons;
said method comprising reacting said metal compound MX with said second protonic acid to form said reaction product, and subsequently mixing said reaction product with said electrically conductive complex of said conjugated polymer and said first protonic acid and, wherein the molar ratio between the acidic protons of said first protonic acid and the aniline repeat units of said conjugated polymer is at least about 0.5; wherein said reaction product neutralizes and plasticizes said electrically conductive polymer composition.

9. Method for making the composition of claim 8, wherein the composition further comprises a substantially nonconductive substrate.

10. Method for making the composition of claim 8, wherein said metal compound is first reacted with said second protonic acid to yield an approximately neutral or slightly acidic reaction product that is subsequently mixed with said electrically conductive complex of said conjugated polymer and said first protonic acid, wherein the molar ratio between the acidic protons of said first protonic acid and the aniline repeat units of said conjugated polymer is at least from about 0.2 to less than about 0.5; and wherein said reaction product plasticizes said composition.

11. A method for making the composition of claim 9, wherein said metal compound is first reacted with said second protonic acid to yield an approximately neutral or slightly acidic reaction product that is subsequently mixed with said substantially nonconductive substrate and said electrically conductive complex of said conjugated polymer and said first protonic acid, wherein the molar ratio between the acidic protons of said first protonic acid and the aniline repeat units of said conjugated polymer is at least from about 0.2 to less than about 0.5; and wherein said reaction product plasticizes said composition and reduces the percolation threshold for electrical conductivity in said polymer composition.

12. Method for making the composition of claim 8, wherein said metal compound is first reacted with an excess of said second protonic acid to yield an acidic reaction product that is subsequently mixed with the complex of said conjugated polymer and said first protonic acid, wherein the molar ratio between the acidic protons of said first protonic acid and the aniline repeat units of said conjugated polymer is in the range from 0 to less than about 0.2, so as to yield an approximately neutral or slightly acidic composition; and wherein said reaction products plasticize said composition.

13. Method for making the composition of claim 9, wherein said metal compound is first reacted with an excess of said second protonic acid to yield an acidic reaction product that is subsequently mixed with said substantially nonconductive substrate and with the complex of said conjugated polymer and said first protonic acid, wherein the molar ration between the acidic protons of said first protonic acid and the aniline repeat units of said conjugated polymer is in the range from 0 to less than about 0.2, so as to yield an approximately neutral or slightly acidic composition; and wherein said reaction product plasticizes said composition and reduces the percolation threshold for electrical conductivity in said polymer composition.

* * * * *